United States Patent [19]

Zeuner

[11] 3,765,644

[45] Oct. 16, 1973

[54] CONTROLLED AIR GAP IN A SOLENOID OPERATED VALVE

[75] Inventor: Kenneth W. Zeuner, Newtown, Pa.

[73] Assignee: Control Concepts Inc., Richboro, Pa.

[22] Filed: Jan. 19, 1972

[21] Appl. No.: 218,875

[52] U.S. Cl. ............................................. 251/129
[51] Int. Cl. ........................................... F16k 31/06
[58] Field of Search ................... 251/129, 141, 139

[56] References Cited
UNITED STATES PATENTS

| | | | |
|---|---|---|---|
| 1,167,815 | 1/1916 | Gold | 251/129 |
| 2,930,404 | 3/1960 | Kowalski et al. | 251/129 X |

FOREIGN PATENTS OR APPLICATIONS

| | | | |
|---|---|---|---|
| 499,268 | 11/1950 | Belgium | 251/129 |

Primary Examiner—Arnold Rosenthal
Attorney—Allan Ratner et al.

[57] ABSTRACT

A single stage normally open solenoid operated poppet valve which has a control orifice and a poppet which moves between a valve open and a seated position. A pole piece adjacent the poppet is spaced from and forms an air gap with an armature which contacts the poppet. On application of electromagnetic flux line flow through the armature and pole piece, the air gap is decreased to a finite predetermined distance of value to provide sufficient attractive force to seat and maintain seated the poppet.

6 Claims, 5 Drawing Figures

Patented Oct. 16, 1973
3,765,644
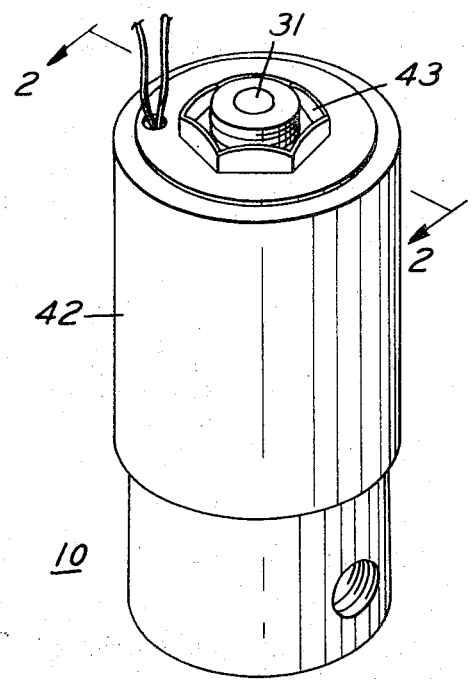
FIG. 1
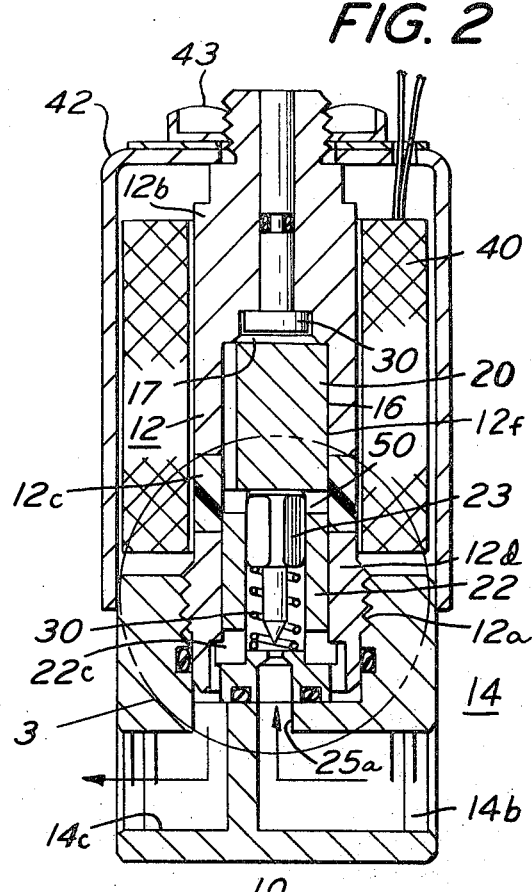
FIG. 2
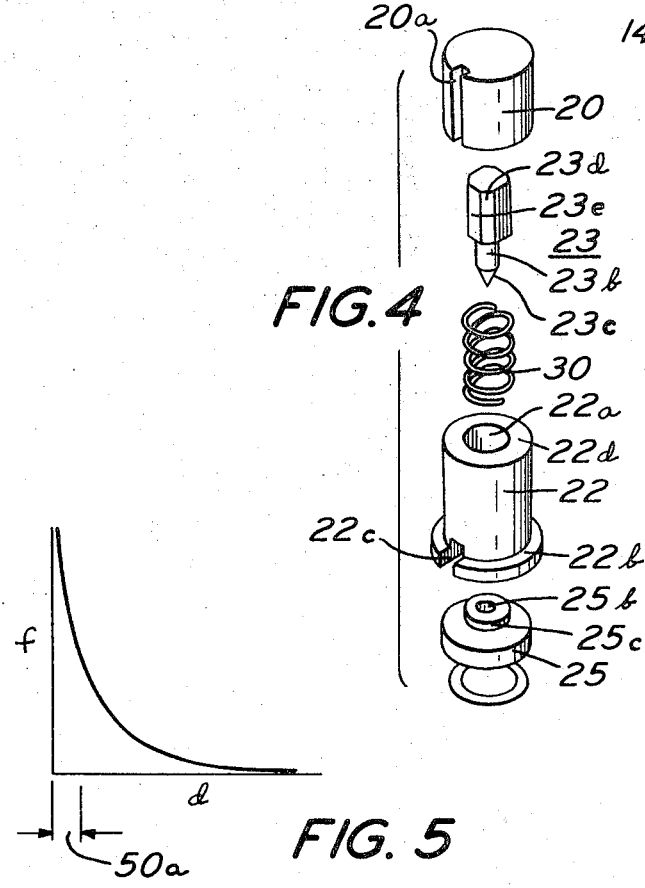
FIG. 4
FIG. 5
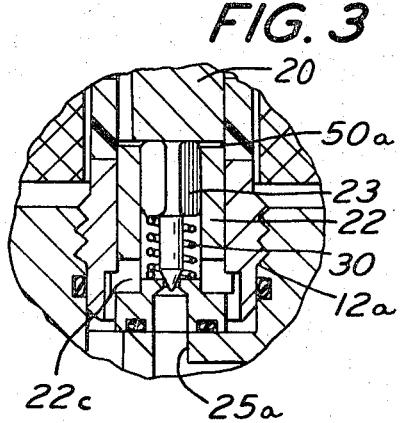
FIG. 3
INVENTOR
KENNETH W. ZEUNER
BY
Maleson, Kimmelman & Ratner
ATTORNEYS

CONTROLLED AIR GAP IN A SOLENOID OPERATED VALVE

BACKGROUND OF THE INVENTION

1. Field of the Invention

This invention relates to the field of normally open solenoid operated valves.

2. Prior Art

In solenoid operated valves which are normally open, and particularly in poppet valves, an air gap in the magnetic flux line circuit has been used through which the attractive force is produced for closing the valve. However, these prior valves have left much to be desired in maintaining the tolerance of the air gap because of practical problems in manufacturing. If the tolerance is not maintained, a positive seating poppet valve, while ordinarily providing the advantage of low leakage, will not function properly and reliably. Accordingly, development work in solenoid operated normally open valves has avoided such positive seated valves and sought other less satisfactory solutions.

SUMMARY OF THE INVENTION

A solenoid operated normally open valve assembly having an orifice to control inlet flow of fluid and a poppet moveable between a valve open position and a position in which the poppet is seated in and closes the orifice. A pole piece is adjacent the poppet and has a surface which is spaced from and forms an air gap with an armature which contacts the poppet. A circuit of electromagnetic flux lines flows through the armature, the air gap and the pole piece thereby seating the poppet in and closing the orifice. With the poppet seated, the air gap is decreased to a finite and predetermined distance of magnitude to provide a sufficient value of attractive force to seat and maintain seated the poppet against the force of inlet flow of fluid.

BRIEF DESCRIPTION OF THE DRAWINGS

FIG. 1 is a perspective view of a normally open solenoid operated valve of the present invention;

FIG. 2 is a sectional view of the valve of FIG. 1 in the valve open position;

FIG. 3 is a sectional view of a portion of FIG. 2 showing the valve closed position;

FIG. 4 is an exploded view of many of the valve elements in FIGS. 2 and 3; and

FIG. 5 is a diagram showing a force-distance relationship across the air gap shown in FIGS. 2–4.

Referring now to FIGS. 1–4, there is shown a single stage normally open solenoid operated poppet valve 10 which comprises a tubular sleeve assembly 12 having formed on its lower outer surface threads 12a which engage upper internal threads 14a of a valve body 14. Sleeve assembly 12 comprises an upper sleeve section 12b, a middle sleeve section 12c and a lower sleeve section 12d. Sections 12b and 12d are made of very high magnetically permeable material (ferromagnetic). On the other hand, section 12c is made of very low magnetically permeable material such as, for example, stainless steel. As shown, sections 12b–d are rigidly secured together as, for example, by welding.

Sections 12b–d together provide an internal cylindrical chamber 16 for housing a solid cylindrical armature 20 and a tubular pole piece 22 having a cylindrical central chamber 22a. Armature 20 is slideably received within chamber 16 with most of the armature being within section 12b and only a lower portion of the armature being within section 12c. Pole piece 22 nests in sealed relation within chamber 16 with a lower flange 22b of piece 22 engaging a lip formed in chamber 16. Most of the pole piece is disposed within section 12d and only the upper portion of piece 22 is within section 12c.

Secured between the bottom edge of pole piece 22 and valve body 14, is a control orifice assembly 25 having a central chamber 25a which is in fluid communication with an inlet 14b of valve body 14 as shown. Chamber 25a tapers upwardly to form at its upper end an orifice 25b which provides a seat with a poppet 23. In order to provide proper alignment, orifice assembly 25 has a shoulder 25c which is received within the lower end of chamber 22a of the pole piece.

Poppet 23, preferably made of hard metal of low magnetically permeable material, is slideably received within chamber 22a and comprises an upper guide portion 23a and a lower portion 23b. The upper surface of portion 23a is contacted by the lower face of armature 20 and portion 23b terminates in a valve plug 23c. Upper portion 23a forms a guide having side walls 23d which contact and slide within chamber 22a and which are dimensioned to assure proper alignment of plug 23c into and out of orifice 25b. In addition, flat walls 23e are formed between side walls 23d to provide flow passages for the fluid.

A spring 30 is disposed between and engages the upper annular surface of assembly 25 and the lower surface of guide 23a. Spring 30 provides sufficient compression or bias to override any residual magnetism to assure that the poppet valve is maintained open.

A pair of aligned channels or slots 22c are formed through the flange and pole piece 22 to permit fluid flow. The fluid flow may be traced from inlet 14b, through chamber 25a, orifice 25b, chamber 22a, channel 22c and then through an increased diameter of chamber 16 and then out through outlet 14c.

In order to produce pressure balance between the upper and lower flat surfaces of armature 20, a longitudinal channel 20a is formed in the outer wall of the armature, Chamber 16 is reduced in diameter above armature 20 to form chamber 17. Accordingly, fluid from central chamber 22a flows through passages 23e of poppet 23 and channel 20a to chamber 17 and in this way to provide pressure balance.

Chamber 17 houses a stop shoe 30 secured to a manual override shaft 31. In the event of loss of electrical power or malfunction of the electromagnetic system, an operator may manually push shaft 31 to force shoe 30 against armature 20, which pushes poppet 23 to close the valve.

For a source of magnetic flux, there is provided a hollow elongated cylindrically shaped electromagnet 40 which receives in a central opening sleeve assembly 12. A cup-shaped cover 42 encloses and protects electromagnet 40 and extends down to valve body 14 and encloses an upper portion thereof. Cover 42 has a central opening for receiving therein an upper threaded portion of sleeve section 12b. Cover 42 is secured in place by nut 43 which threadedly engages the outer threads of section 12b. Cover 42 as well as armature 20, pole piece 22 and body 14 are formed of high magnetically permeable material (ferromagnetic).

A circuit of magnetic flux lines produced by electromagnet 40 when energized may be traced as follows.

The flux lines flow down through sleeve section 12b and then across through armature 20 and air gap 50 to pole piece 22. The flow continues through sleeve section 12d, body 14 and cover 42 with the circuit being completed to section 12b. Sleeve section 12c is made of very low magnetically permeable material and extends above and below (in the area generally adjacent) air gap 50 so that section 12c provides a gap to the circuit greater than that of gap 50. Accordingly, the circuit of flux lines is directed and concentrated through air gap 50 and this is the only effective gap in the entire flux line circuit. The circuit as traced flows as loosely concentrated lines of flux through large cross-sectional areas of high magnetically permeable material. For example, the circuit through cover 42 provides a large cross-sectional area as well as the cross-sectional areas of sleeve sections 12b and 12d. However, the flux lines are concentrated through armature 20 to the upper annular surface 22d of pole piece 22. Thus, the loosely concentrated flux lines are concentrated within the relatively small area of surface 22d. As understood by those skilled in the art, this concentration results in a high value attractive force between armature 20 and pole piece 22 when gap 50 narrows in operation as described below. In operation, as shown in FIG. 3, electromagnet 40 has been energized so that armature 20 has been attracted to pole piece 22. The armature forces down on poppet 23 so that poppet valve plug 23c is seated within valve seat orifice 25b for a valve closed state. Poppet 23 is dimensioned to have a total height (longitudinal length from valve seat to upper surface) so that when it is seated, air gap 50 is compressed to provide a "controlled" air gap 50a. This controlled air gap 50a is necessary to allow for wear on valve plug 23c and orifice 25b. With the plug seated, if the upper surface of poppet 25 were level with pole piece upper surface 22d, then as wear would take place, the valve would leak.

In the valve closed state, a substantially high value force is necessary to keep poppet plug 23c seated against the inlet force of fluid. This seating force is achieved by the above described concentration of flux lines which now flow across the narrower size controlled air gap 50a and produces a substantially high value attractive force between armature 20 and pole piece 22. FIG. 5 illustrates a typical curve relationship of such attractive force $f$ plotted with respect to the distance of the air gap $d$. Thus, controlled air gap 50a is dimensioned so that from the curve sufficient attractive force will be produced to seat and maintain seated the poppet against the inlet force of fluid.

In summary, it will be understood that the air gap varies from gap 50 in the valve normally open state to gap 50a in the valve closed state. Thus, poppet 23 is dimensioned in height with respect to the distance between orifice 25b and pole piece upper surface 22d so that in the valve closed state, armature 20 does not touch the pole piece and a decreased finite gap 50a is provided.

A high value attractive force is only necessary in the valve closed state to seat the poppet against the inlet force of fluid. Thus, by the concentration of flux lines and a controlled air gap of predetermined size, that high value force is produced.

What is claimed is:

1. A normally open valve assembly comprising
   an orifice for controlling inlet flow of fluid.
   plug means moveable between a valve normally open position and a position for seating in and closing said orifice,
   an armature for contacting said plug means,
   pole piece means forming a chamber for slideably receiving substantially all of said plug means and having a surface spaced from and forming an air gap with said armature,
   means producing a circuit of electromagnetic flux lines flow through said armature, said air gap and said pole piece means for providing an attractive force between said armature and said pole piece means seating said plug means in and closing said orifice, and
   said air gap being decreased in magnitude to a finite predetermined distance of magnitude to provide a sufficient value of said attractive force to seat and maintain seated said plug means against the force of said inlet flow of fluid.

2. The valve assembly of claim 1 in which there is provided means for biasing said plug means to said valve normally open position.

3. The valve assembly of claim 2 in which there is provided a housing for said armature, pole piece means and plug means, said housing being of very high magnetically permeable material except in the area generally adjacent said air gap whereby said flux lines flow through said housing and provide a concentration of flux lines through said armature and said air gap to said spaced surface of said pole piece to provide said value of attractive force.

4. The valve assembly of claim 3 in which said plug means having a surface for said contact with said armature, said plug means being of length with respect to said orifice to prevent said armature from touching said pole piece in said plug means seating position thereby providing said decreased size air gap.

5. The valve assembly of claim 4 in which said plug means comprises a poppet having a guide portion and a portion terminating in a valve plug, said guide portion having side walls which contact said chamber and are dimensioned to provide alignment of said valve plug into and out of said orifice.

6. The valve assembly of claim 2 in which said plug means has walls which contact and slide within said chamber and in which said walls and said chamber are dimensioned to provide proper seating alignment of said plug means in said orifice.

* * * * *